Patented Jan. 2, 1934

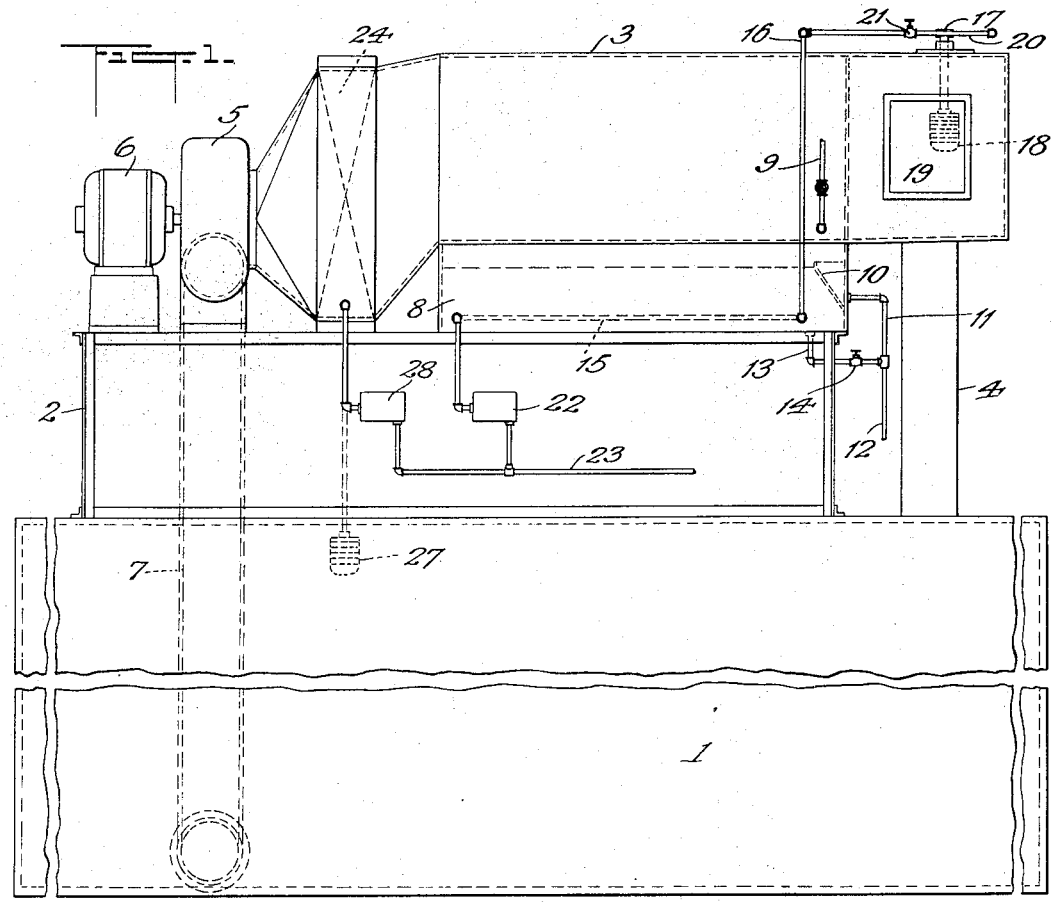
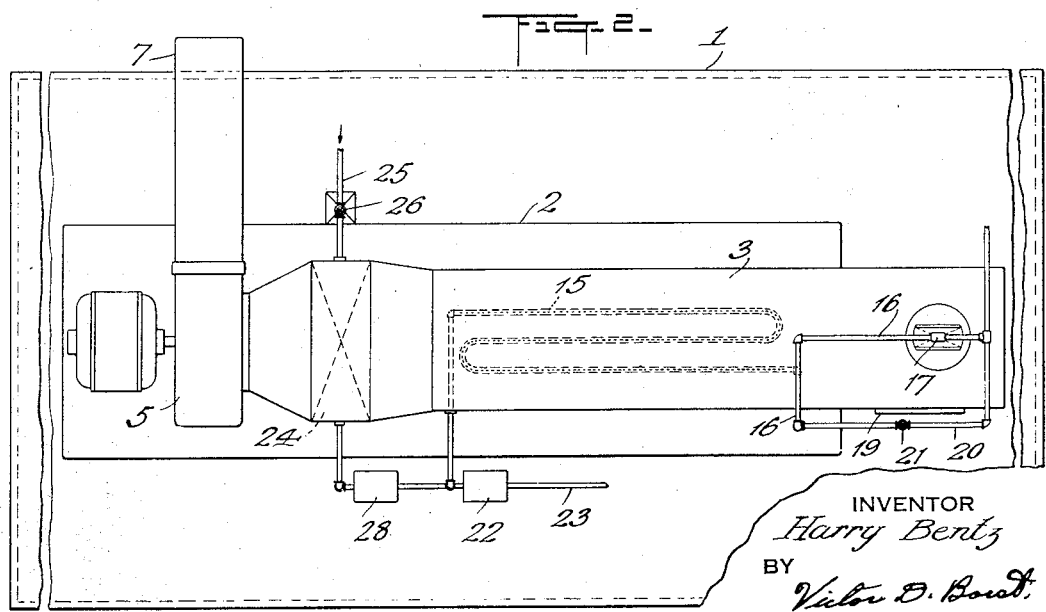

1,941,653

UNITED STATES PATENT OFFICE 1,941,653

PROOFING DOUGH

Harry Bentz, Montclair, N. J.

Application January 21, 1933. Serial No. 652,787

1 Claim. (Cl. 261—15)

Where bread is made for the public as by large commercial bakeries, it is essential that the same loaf, exact in appearance and quality, be produced consistently. This can only be done by properly controlling the conditions under which each step in the making of the bread is carried out and maintaining these conditions constant. Among the steps in which the conditions must be accurately controlled in order to produce the same loaf consistently, is that of the proofing of the dough, the final step before baking. Commonly, this step is carried out by placing the dough, which has been previously cut in to individual pieces, in to a proofing cabinet or box where it is left over a period of time in contact with heated air containing moisture. The air within the proofing cabinet should be of a certain temperature and humidity in order for the proofing to be carried out properly and these conditions must be maintained constant while the cabinet is used in order that the same loaf will be consistently produced. The optimum results are obtained if the moisture in the air is in the form of a gaseous vapor as in this form it is more evenly distributed and readily permeates the dough.

By my invention I provide an apparatus for maintaining the optimum conditions in a proofing cabinet. In accordance with the apparatus of my invention the air of the proofing cabinet is continuously reconditioned and the reconditioning is thermostatically controlled so that the optimum conditions for proofing dough are always maintained within the proofing cabinet. The air in the proofing cabinet is continuously withdrawn from a point adjacent the top of the proofing cabinet and is led over the free surface of water in an open container. The water is heated by a heating element submerged within the water container so that a gaseous vapor is driven off from the free surface of the water. The amount of heat transferred to the water, and therefore the quantity of vapor driven off, is dependent upon the humidity of the air as it is withdrawn from the proofing cabinet. In this way, all of the moisture entering the air is in the form of gaseous moisture and there are no globules of entrained moisture carried by the air. After the air has passed over the water container and absorbed moisture therefrom, it is led through an air heater from which heat is transferred to the air in a greater or lesser amount according to the temperature of the air within the proofing cabinet. For controlling the amount of moisture introduced into the air and the heat transferred to the air, both the water heater and the air heater are regulated by thermostatic control elements. One of these elements, that controlling the water heater, is mounted adjacent the point at which air is withdrawn from the proofing cabinet, and the other control element, the temperature control, is located within the proofing cabinet adjacent the top thereof. After the air has been reconditioned it is returned to the proofing cabinet adjacent the bottom of the cabinet and rises over the dough placed on the racks in the cabinet.

The proofing cabinet used with my apparatus may be any of the well known types of proofing cabinets. On the top of the proofing cabinet there is located the apparatus for carrying out my method of conditioning the air of the proofing cabinet. Specifically this apparatus consists of an air duct in one portion of which there is mounted an open water container so that as the air passes through the duct, it passes over the free surface of the water. Following the water container, relative to the direction of flow of air through the air duct, there is an air heater within the air duct through which air passing through the duct, must pass. This air heater transfers heat to the air. The air is caused to circulate through the air duct by a fan which may be driven by any well known means. One end of the air duct, the inlet end, is connected to the proofing cabinet at the top of the cabinet. The other end of the air duct communicates with a series of horizontal ducts in the bottom of the cabinet which have a plurality of orifices through which the reconditioned air is injected into the proof box. The air returned to the proof box rises over the dough in the proof box to the top thereof. In the open water container from which the air receives moisture, there is a heater for heating the water and driving off a gaseous vapor. This heater and the air heater in the duct are controlled thermostatically by the well known wet and dry bulb controls. The temperature control element is located within the cabinet adjacent the ceiling thereof, and the humidity control element is placed within the air duct between the water container and the inlet end of the air duct. These control elements regulate the amount of heat supplied to the heating elements in the water and the air duct and thus control the humidity and temperature of the air within the proof box.

The apparatus of my invention will be more clearly understood from the following particular description of one embodiment thereof which is shown in the accompanying drawing, in which:

Fig. 1 is an elevation of a proofing cabinet constructed in accordance with my invention; and Fig. 2 is a plan of the same.

In the drawing, the proofing cabinet 1 is illustrated somewhat diagrammatically as this portion of the cabinet is old and well known; it represents a cabinet in which there are stationary racks upon which the individual pieces of dough to be proofed are placed. On top of the proofing cabinet there is built a platform 2 on which the air reconditioning apparatus for carrying out my method for maintaining the proper proofing conditions in the cabinet is mounted. This apparatus consists of an air duct 3 of rectangular cross section in which the apparatus for reconditioning the air is mounted. Air from the proofing cabinet is delivered to this air duct through an inlet branch duct 4 connected at one end to the proofing cabinet through the top thereof and at the other end to one end of the duct 3. The opposite end of the duct 3 communicates with the inlet end of a centrifugal fan 5 which is driven by an electric motor 6 and which causes air to pass through the air duct. The exhaust end of the fan 5 communicates with a return branch duct 7 that leads to the bottom of the cabinet. This return branch duct communicates with a series of horizontal air ducts (not shown) at the bottom of the cabinet which are perforated along the under side thereof to form a series of orifices through which the air is discharged into the proofing cabinet. As the fan 5 is rotated air is withdrawn through the inlet branch duct 4 into the air duct 3 and discharged through the return duct 7 and the orifices in the several ducts along the bottom of the proofing cabinet.

Intermediate the ends of the duct 3 on the top of the proofing cabinet, the air duct communicates with an open water container or reservoir 8 which is secured to the air duct and forms the bottom thereof. The water container is supplied with water through a supply pipe 9 which communicates with a float valve of the well known type and which maintains the quantity of water in the container constant. An overflow 10 is also provided to prevent the water, in case of failure of the float valve, from rising in to the air duct. The overflow is connected through a pipe 11 to a discharge pipe 12. The bottom of the water container is also connected, through a branch pipe 13 and a discharge valve 14, to the discharge pipe 12 so that the container may be emptied for cleaning purposes or for repair. Within the water container adjacent the bottom thereof, there is located a heating coil 15 which is supplied with steam through a steam supply pipe 16. The coil is adapted to heat the water in the container so that a gaseous vapor is driven off from the free surface of the water. The steam supply pipe 16 has connected therein a valve 17 which is operatively connected to a control element 18 responsive to the moisture content of the air and located within the air duct immediately preceding the water container relative to the direction of motion of air through the air duct. In the side of the air duct adjacent this control element, there is located a door 19 through which the interior of the air duct and the control element is accessible. A branch steam supply line 20, having a manually controlled valve 21 therein, is provided so that the humidostat controlled line may be by-passed and the heating coil regulated manually. The exhaust side of the heating coil is connected through a float trap 22 to the returned steam line 23. Thus the amount of heat supplied to the water and consequently the amount of vapor driven off from the free surface of the water may be, and in normal operation is, regulated in accordance with the quantity of moisture carried by the air entering the air duct.

Following the water container, the air duct flares outwardly and unites with a section in which there is located an air heater or air re-heater 24. This also consists of a coil which is supplied with steam for transferring heat to the air passing through the air duct. The air re-heater coil is supplied with steam from a steam supply pipe 25 in which there is a thermostatically controlled valve 26. This valve is controlled by a thermostatic control element 27 located within the proof box adjacent the ceiling thereof. The exhaust end of this heater is connected through a float trap 28 to the return steam line 23. From the air heater the air duct tapers to the inlet of the fan 5 which circulates the air.

As the fan is rotated air is drawn from the top of the proofing cabinet through the inlet branch duct 4 and in to the air duct 3. As it enters the air duct, it passes in contact with the humidostat 18 for regulating the heat supplied to the water in the water container 8. Depending upon the amount of moisture in the air, more or less steam will be supplied to the heating coil 15 in the water container and a greater or lesser amount of vapor will be driven off from the free surface of the water into the air duct and the path of the air flowing therethrough. It will of course be apparent that all of the moisture which passes into the air will be in a gaseous vapor state as no globules can rise from this free surface and be entrained in the air. The air next passes through the air re-heater 24 which is supplied with steam in accordance with the temperature within the proof box, and the air is then returned to the proof box through the longitudinal ducts in the bottom of the proof box. For the proofing of bread, I have found it preferable to maintain the humidity of the air within the proof box between 85 and 87% and in the manufacture of sweet goods higher relative humidities are maintained.

By introducing the moisture into the air in the form of a gaseous vapor it is uniformly distributed through the air and as the air rises over the dough in the proof box it is uniformly distributed through the proofing cabinet, permeating the dough and producing a uniform proofing.

It will be obvious that various changes may be made by those skilled in the art in the details of the apparatus for carrying out my invention as described above within the principle and scope of my invention as expressed in the appended claim.

I claim:

A proofing box comprising a cabinet, an air duct mounted on the top of the cabinet and communicating at the inlet end with the cabinet adjacent the top thereof and communicating at the outlet end with the cabinet adjacent the bottom of the cabinet, means within the air duct for causing air to pass therethrough from the inlet to the outlet, an open water container in the air duct, means for introducing water into the container and maintaining the water therein at a predetermined level, a heater within the water container for heating the water to drive off a vapor, an air heater within the air duct for heating the air passing therethrough, said air heater being towards the outlet end of the duct relative to the water container, a thermostatic control element at the inlet end of the duct for regulating the heat supplied to the water, and a thermostatic control element within the proofing box adjacent the top thereof for regulating the heat transferred from the air heater to the air passing through the duct.

HARRY BENTZ.